March 23, 1965 F. R. SHAFER 3,175,152
TRANSISTORIZED WIND SPEED INDICATING AND RECORDING SYSTEM
Filed March 14, 1961
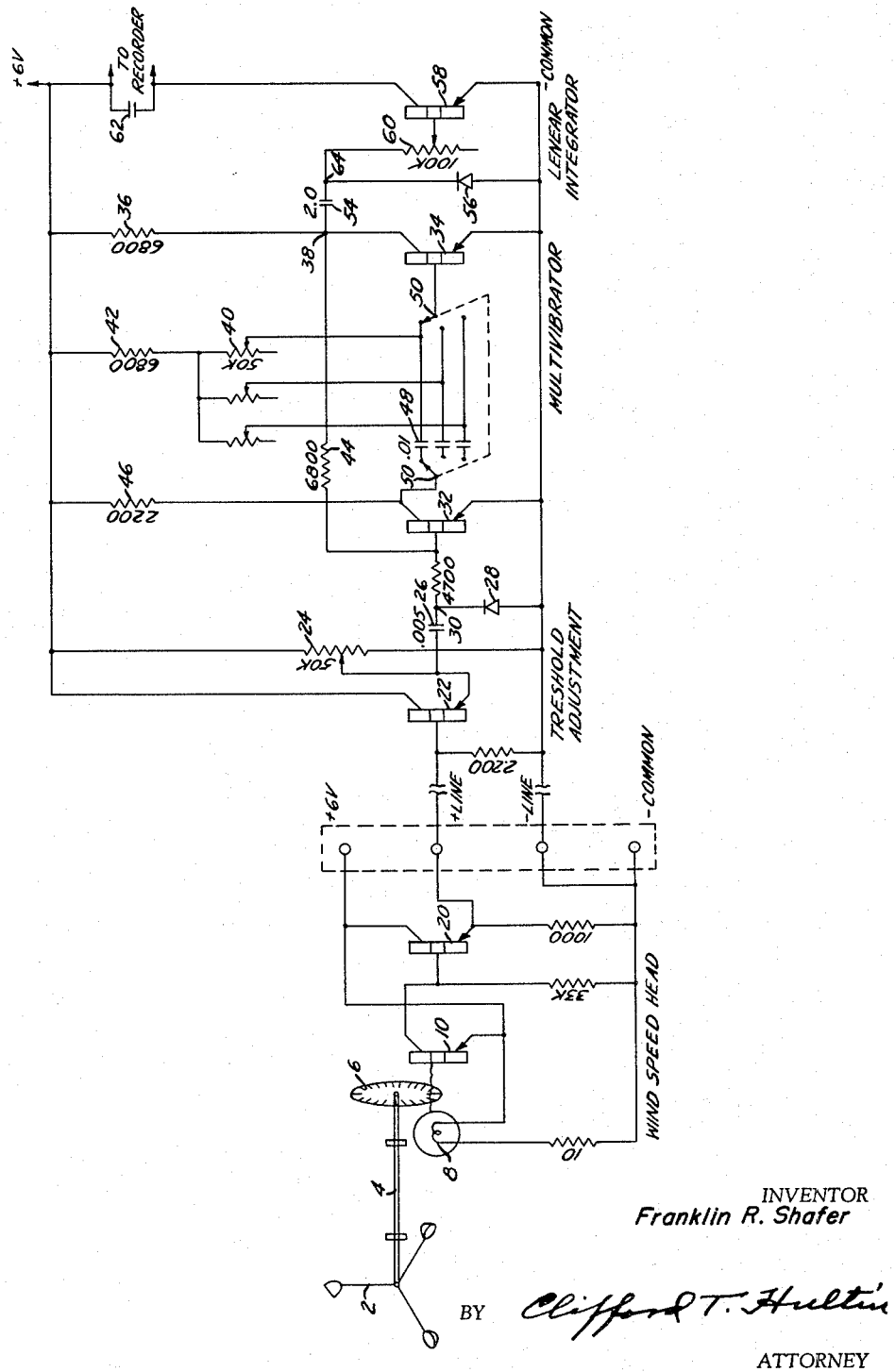
INVENTOR
Franklin R. Shafer
BY *Clifford T. Hultin*
ATTORNEY

United States Patent Office 3,175,152
Patented Mar. 23, 1965

3,175,152
TRANSISTORIZED WIND SPEED INDICATING
AND RECORDING SYSTEM
Franklin R. Shafer, Tooele, Utah, assignor to the United
States of America as represented by the Secretary of the
Army
Filed Mar. 14, 1961, Ser. No. 95,752
3 Claims. (Cl. 324—70)
(Granted under Title 35, U.S. Code (1952), sec. 266)

The invention described herein may be manufactured and used by or for the Government of the United States of America for governmental purposes without the payment to me of any royalty thereon.

This invention relates to a device for measuring wind speed. More specifically, it relates to a system for measuring and recording wind speed at a distance. It is sometimes desired to determine wind speeds at relatively inaccessible areas and to record them at a more accessible location. All of these results are achieved by means of the present invention, the mechanism and circuit of which is shown in the drawing.

This drawing shows the anemometer 2 supported on shaft 4. At the opposite end of shaft 4 is a small perforated disc 6 having a series of radial holes near the periphery thereof. This disc is positioned between a light source 8 and a phototransistor 10 in such manner that a beam from the light source passes through the perforations in the disc and on to the phototransistor thereby allowing the light falling on the phototransistor to be interrupted as the disc rotates.

The phototransistor (TI 800) is actuated by the light pulses and causes current pulses to flow through the 33 K resistor and to appear on the base of transistor 20. The collector of transistor 20 is connected to a +6 volt supply while its emitter is connected by a 1000 ohm resistor to the common negative. The output of this emitter is a 4.5 volt positive pulse from a low impedance emitter follower source capable of traveling long distances over a wire pair. This is shown in the drawing as a + and − "line" and may be many miles in length.

Following the "line" is a threshold circuit composed of a transistor 22, the base of which is at a negative potential due to connection through the 2200 ohm resistor to the common negative. Its collector is directly connected to the positive 6 v. supply. The emitter of transistor 22 is connected to the adjustable contact of the 50K potentiometer 24 which in turn appears across the 6 v. battery. This enables the transistor to be cut off for all negative pulses and starts to conduct only when the incoming positive pulse reaches the bias voltage of the emitter. This single adjustment allows the peaks of the desired pulses to pass through to the next circuit and to exclude all others.

The differentiating circuit consists of an .005 mfd. condenser 26, a diode 28 (1N38A) and a 4700 ohm isolating resistor. Capacitor 26 is connected to the emitter of threshold stage 22. Steep rising positive pulses carry junction 30 positive, but cannot hold it there because the voltage across the capacitor changes as current flows through the 4700 ohm resistor and the base of transistor 32. Similarly, as the pulse falls in value, it cannot go far due to diode 28. The result is a positive spike of short duration which will actuate the multivibrator. The latter is a one shot type using two transistors 32 and 34. In its normal state, transistor 34 is drawing saturation collector current through the 6800 ohm resistor 36. Junction 38 is almost down to negative common potential. The voltage at the base of 34 is very low, due to base current flowing through the 50K potentiometer 40 in series with the 6800 ohm resistor 42. Feedback resistor 44 of 6800 ohms keeps the base of transistor 32 at almost negative common potential so that the transistor is cut off and draws no collector current through the 2200 ohm resistor 46. The collector of transistor 32 is at +6 volts.

When the + spike of the differentiator circuit is applied to the base of transistor 32 it starts to draw collector current through resistor 46 causing the collector voltage to become less positive. The negative travel of potential is carried through the .01 microfarad capacitor 48 to the base of transistor 34 reducing its collector current and consequently the drop across resistor 36. Junction 38 then starts to go more positive and carries the base of transistor 32 with it. This process is cumulative and drives 32 to saturation and 34 to cut-off.

The base of 34 is driven to several volts below cut-off, but immediately starts to rise as capacitor 48 is discharged through resistor 42 and potentiometer 40. When it reaches cut-off or the conduction point depending on the time constant of the combination of resistors 40 and 42 and capacitor 48, transistor 34 starts to draw collector current through resistor 36 causing the collector to become more negative and carrying the base of transistor 32 down with it, cutting it off, thus restoring the multivibrator to its stable state.

The output at junction 38 is a square positive pulse of a definite voltage amplitude and a time duration determined by the time constant of capacitor 48 and the sum of resistances 40 and 42. By changing the width of this pulse either with capacitor 48 or potentiometer 40, the speed range of the circuit can be changed. By means of the 2 section switch 50, several ranges can be made available. In this system, .01 mfd. was found best for 0 to 60 mile range, .02 mfd. for 0 to 30 mile range, and .04 mfd. for 0 to 15 mile range.

The next circuit is the linear integrator. This consists of a 2.0 mfd. coupling capacitor 54, a diode 56, a transistor 58 with a very low leakage, a 100K potentiometer 60 and a recorder meter with a damping capacitor 62. The value of the latter may be as low as 5 microfarads, which gives a fairly rapid response, or as high as several hundred microfarads to give a more average reading.

When the multivibrator is in the normal state, the base of transistor 58 is at the negative common potential and is cut off so no collector current flows. When the multivibrator is triggered, junction 38 goes up almost to the positive 6 volts and remains there for the duration of the pulse. Capacitor 54 carries junction 64 positive with it and due to the diode action of the base of transistor 58, current flows, causing collector current to flow through the recorder. The voltage across capacitor 54 tends to change slightly as this occurs, but since the pulses are all identical approximately the same quantity of electrons flow through the base of the transistor for each pulse so the average current is directly proportional to the number of pulses per second, hence the collector current is also directly proportional to the frequency of the pulses. As the positive pulses at 38 fall off, junction 64 is driven below the negative common voltage cutting off the transistor but causing the diode 56 to conduct and restore the voltage across capacitor 54 to its original value.

Potentiometer 60 is adjusted to give the range of current to suit the meter or recorder used. A 0 to 1 milliampere recorder is best adapted, but other ranges may be used. Potentiometer 60 can be adjusted to compensate for changing transistor 58.

The best linearity results when the values of capacitor 48 was selected so that the combination of resistor 42 and potentiometer 40 approximate 100K.

Transistors used are of the NPN type and should have low leakage and good gain characteristics.

I claim:
1. In a wind speed indicator utilizing a shaft supported anemometer, a revolving member on said anemometer shaft for producing light pulses at a frequency proportional to the wind speed, photosensitive means to detect said light pulses, electronic means for amplification and transmission of pulses emanating from said photosensitive means, the improvement consisting of means for measuring the frequency of said pulses comprising a source of power supply potential, a semiconductor variable bias emitter follower for selecting and transmitting only pulses of a given peak value from said electronic means and consisting of a transistor having its base connected to said electronic means and to the negative potential of said power supply through a resistor and a potentiometer connected from the negative to the positive potential of said power supply, the emitter of said transistor connected to the movable arm of said potentiometer, the collector of said transistor connected to said positive potential, a monostable multivibrator, a differentiating circuit for changing the shape of the pulses from said variable bias emitter follower to a spike form for triggering said monostable multivibrator consisting of a series connected capacitor and resistor coupling said emitter to the input of said monostable multivibrator and a diode having its cathode connected to the junction of said series connected capacitor and resistor and its anode connected to said negative potential, and a transistorized linear integrating circuit coupling the output of the monostable multivibrator to a recording means whereby the average current passing through said recording means is proportional to the frequency of said multivibrator which is determined by the wind speed.

2. The invention in accordance with claim 1 wherein said monostable multivibrator includes variable capacitances and resistances to provide pulses of varying duration to accommodate wind speed ranges.

3. The invention in accordance with claim 2 wherein said monostable multivibrator includes a potentiometer to provide for adjustment of current to suit said recording means.

References Cited by the Examiner

UNITED STATES PATENTS

| 1,957,681 | 5/34 | Thompson. | |
| 2,325,927 | 8/43 | Wilbur | 73—229 |
| 2,352,082 | 6/44 | De Rosa | 324—78 X |
| 2,683,813 | 7/54 | Friedman. | |
| 2,890,352 | 6/59 | Goodrich | 307—88.5 |
| 2,956,227 | 10/60 | Pierson | 324—78 |
| 2,974,525 | 3/61 | Cole | 73—231 |

FOREIGN PATENTS

| 606,278 | 8/48 | Great Britain. |

OTHER REFERENCES

"A Simple Direction Sensitive Phototransistor Circuit for Use in Optical Pulse-Counting System," article in the Journal of Scientific Instruments, December 1956, pp. 483–486.

"Speed Indicator Has Expanded Scale," article in Electronics, pp. 188–190, May 1, 1957.

"Transistor Count Rate Systems," article in Electrical Engineering, July 1958, pp. 623–625.

WALTER L. CARLSON, *Primary Examiner.*
JOHN P. BEAUCHAMP, *Examiner.*